(12) United States Patent
Probst et al.

(10) Patent No.: US 9,787,006 B2
(45) Date of Patent: Oct. 10, 2017

(54) CABLE TERMINATION FOR CONNECTING A SWITCHGEAR ASSEMBLY TO A HIGH-VOLTAGE CABLE

(71) Applicant: ABB Schweiz AG, Baden (CH)

(72) Inventors: Heinrich Probst, Blankenbach (DE); Chetan Prajapati, Vadodara (IN); Martin Hallas, Darmstadt (DE); Michael Desch, Bad Soden Salmünster (DE)

(73) Assignee: ABB Schweiz AG (CH)

( * ) Notice: Subject to any disclaimer, the term of this patent is extended or adjusted under 35 U.S.C. 154(b) by 0 days.

(21) Appl. No.: 15/397,546

(22) Filed: Jan. 3, 2017

(65) Prior Publication Data

US 2017/0117641 A1    Apr. 27, 2017

Related U.S. Application Data

(63) Continuation of application No. PCT/EP2015/063185, filed on Jun. 12, 2015.

(30) Foreign Application Priority Data

Jul. 1, 2014    (DE) .................... 20 2014 005 301 U (51) Int. Cl.
*H01R 9/11* (2006.01)
*H01R 24/86* (2011.01)
(Continued)

(52) U.S. Cl.
CPC ............... *H01R 9/11* (2013.01); *H01R 13/53* (2013.01); *H01R 24/86* (2013.01); *H01R 2105/00* (2013.01)

(58) Field of Classification Search
CPC .......... H01R 29/00; H01R 13/53; H02G 5/06; H02G 15/00; H02G 5/00
(Continued)

(56) References Cited

U.S. PATENT DOCUMENTS 3,927,246 A * 12/1975 Tahiliani ................ H02G 15/22
174/19
4,154,993 A * 5/1979 Kumbera ............. H02B 11/133
200/50.24
(Continued)

FOREIGN PATENT DOCUMENTS

DE    7738424 U1    3/1978
DE    202014003281 U1    7/2014
JP    S637905 U    1/1988

OTHER PUBLICATIONS

European Patent Office, International Search Report & Written Opinion issued in corresponding Application No. PCT/EP2015/063185, dated Aug. 20, 2015, 9 pp.

*Primary Examiner* — Alexander Gilman (74) *Attorney, Agent, or Firm* — Taft Stettinius & Hollister LLP (57) ABSTRACT

A cable termination comprises, amongst other things, three insulated cable connection elements which project into a housing and have an internal conductor, and also three phase connection parts which are designed as hollow bodies and likewise project into the housing from a side which is situated opposite the cable connection elements and into each of which one of three cable end reinforcements can be inserted. The cable connection elements and the phase connection parts each form the corners of a triangle. These triangles are rotated in relation to one another in their respective plane, so that an offset is created. In order to bridge the offset, a connecting element is arranged between in each case one cable connection element and the associated phase connection part, the said connecting element being designed such that it can be partially or entirely removed in order to establish an isolating gap.

20 Claims, 5 Drawing Sheets

(51) Int. Cl.
*H01R 13/53* (2006.01)
*H01R 105/00* (2006.01)

(58) Field of Classification Search
USPC ........ 439/189, 187, 921, 88; 174/24, 28, 25, 174/86
See application file for complete search history.

(56) References Cited

U.S. PATENT DOCUMENTS

| | | | | |
|---|---|---|---|---|
| 4,232,925 A * | 11/1980 | Behnke | ............. | H02B 13/0352 174/86 |
| 5,427,538 A * | 6/1995 | Knapp | ................... | H01R 13/53 439/157 |
| 5,447,453 A * | 9/1995 | Smith | ............... | H01R 13/5202 439/519 |
| 5,571,990 A * | 11/1996 | Pham | .................... | H02G 5/066 174/24 |
| 5,907,123 A * | 5/1999 | Lobner | .................. | H02G 5/066 174/28 |
| 6,281,431 B1 * | 8/2001 | Cumley | ............... | G02B 6/4446 174/25 G |
| 6,332,785 B1 * | 12/2001 | Muench, Jr. | ........... | H01R 13/53 439/88 |
| 6,797,875 B2 * | 9/2004 | Gelloz | .................. | H02G 5/063 174/25 G |
| 7,381,103 B2 * | 6/2008 | Luzzi | .................... | H01R 13/53 439/801 |
| 7,503,785 B2 * | 3/2009 | Stepniak | ................ | G01R 15/16 439/187 |
| 8,128,423 B2 * | 3/2012 | Borgstrom | .......... | H01H 1/0015 439/181 |
| 9,070,997 B2 * | 6/2015 | Spalding | ............... | H01R 13/46 |
| 9,124,050 B2 * | 9/2015 | Siebens | ................ | H01R 13/53 |
| 9,165,700 B2 * | 10/2015 | Schops | .................. | H02G 15/22 |
| 9,350,103 B2 * | 5/2016 | Siebens | ................ | H01R 13/207 |
| 2012/0021650 A1 * | 1/2012 | Borgstrom | ......... | H01R 13/5216 439/626 |

* cited by examiner

CABLE TERMINATION FOR CONNECTING A SWITCHGEAR ASSEMBLY TO A HIGH-VOLTAGE CABLE

The invention relates to a cable termination for connecting a switchgear assembly to a high-voltage cable.

Cable terminations are intended to be understood to mean the cable connection which is to be provided by the switchgear assembly manufacturer in an encapsulated switchgear assembly. Presently, this is a cable termination which serves to connect a high-voltage switchgear assembly, in particular a gas-insulated switchgear assembly (GIS), to a three-phase high-voltage cable or three single-phase high-voltage cables. The voltage range of 72.5 kV to 170 kV, in which three single-phase cable connections are primarily used, is of particular interest. For the purpose of gas inclusion, as protection against direct contact and also against environmental influences, the connection between a cable and a switchgear assembly is encapsulated in a metal housing. This housing is permanently installed in the switchgear assembly. The cable termination therefore constitutes a cable receptacle which is pre-installed in the switchgear assembly. This cable receptacle is connected to a cable connection part which is fitted to the cable end, as a result of which the electrical connection is established.

The abovementioned electrical connection of the cable receptacle is intended to be provided with an extended function in order to be able to establish an insulating gap in the cable receptacle as required. In the prior art, the insulating gap is implemented vertically along the conductor guide.

Proceeding from the prior art, the object of the invention is to provide a cable termination for connecting a switchgear assembly to a high-voltagecable, with which cable termination the the required additional function of the "insulating gap" can be realized in a compact manner.

This object is achieved by a cable termination which serves to connect a switchgear assembly to a three-phase high-voltage cable or three single-phase high-voltage cables, comprising:
  at least one housing,
  three insulated cable connection elements which protrude into the housing and have an internal conductor for establishing an electrical connection of the switchgear assembly to in each case one cable end reinforcement which is fitted to the end of a phase of a high-voltage cable, and
  three phase connection parts which likewise protrude into the housing from a side which is situated opposite the cable connection elements, which are designed as hollow bodies and into which in each case one of the cable end reinforcements is to be inserted, wherein
  the insulated cable connection elements are arranged in a first plane, which runs perpendicular to the entry direction of the cable connection elements into the housing, such that they form the corners of a firsttriangle,
  the phase connection parts are arranged in a second plane, which is parallel to the first plane, such that they form the corners of a second triangle,
  the respective corner of the first triangle, which corner corresponds to a cable connection element, and the respective corner of the second triangle, which corner corresponds to a phase connection part which is to be connected to the cable connection element, form two corners which are associated with one another,
  the first triangle and the second triangle are rotated in relation to one another within their respective plane, wherein the rotation takes place starting from a position in which, in a plan view perpendicular to the first and second plane, the distances between the respectively associated corners of the first triangle and of the second triangle assume a value which is as small as possible,
  a connecting element is arranged between in each case one cable connection element and the associated phase connection part.

The electrical connection between the first triangle and the second triangle can be interrupted by completely or partially removing the three connecting elements, wherein the removal itself can be made possible by any desired mechanism. In this case, the releasing mechanism allows an insulating gap to be produced between the cable and the gas-insulated switchgear assembly.

In this case, the internal conductors of the cable connection elements and the phases of the high-voltage cable within the housing are preferably oriented parallel to one another in a first direction, and the connecting elements each bridge an offset, which is produced on account of the rotation, between the cable connection element and the associated phase connection part.

In this case, a first direction which runs in the vertical, as a result of which the offset is produced in the horizontal direction, is preferred in particular. The insulating gap, which results after the removal of in each case one of the connecting elements, between the first and the second triangle therefore has a component in the vertical and in the horizontal, wherein the component in the horizontal has the greater magnitude.

The invention and the realisation of said invention will now be described in greater detail with reference to the exemplary embodiments which are illustrated in the further drawings, in which.

Figure 1:
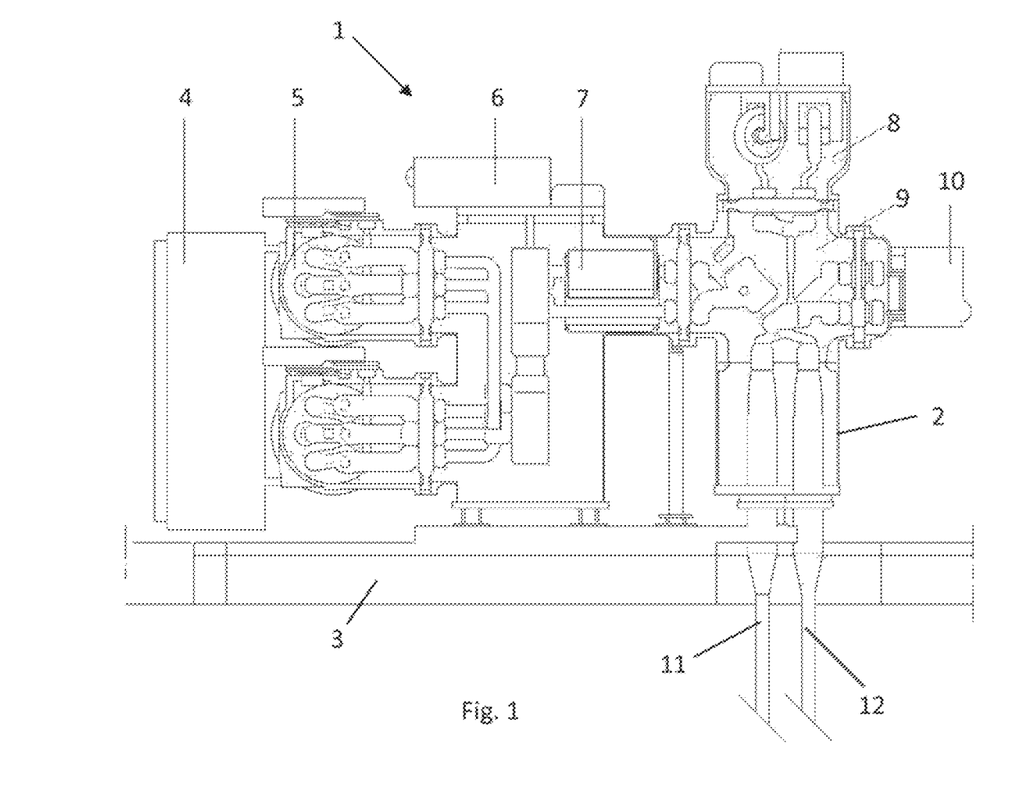
FIG. 1 shows an exemplary gas-insulated switchgear assembly with a cable termination.

FIG. 1 shows a gas-insulated switchgear assembly 1, known from the prior art, which is situated on a foundation 3, is operated by means of a control cabinet 4 and has the following constituent parts of three-phase design: a busbar 5 with a combined isolating and grounding switch, a circuit breaker 6, a current transformer 7, a voltage transformer 8, a combined line isolating and grounding switch 9, a makeproof grounding switch 10 and also a cable termination 2 to which high-voltage cables 11 and 12 are connected. The third high-voltage cable, that is to say the third of the three phases, is not visible in the illustration since it is located directly behind the high-voltage cable 11.

Figure 3:
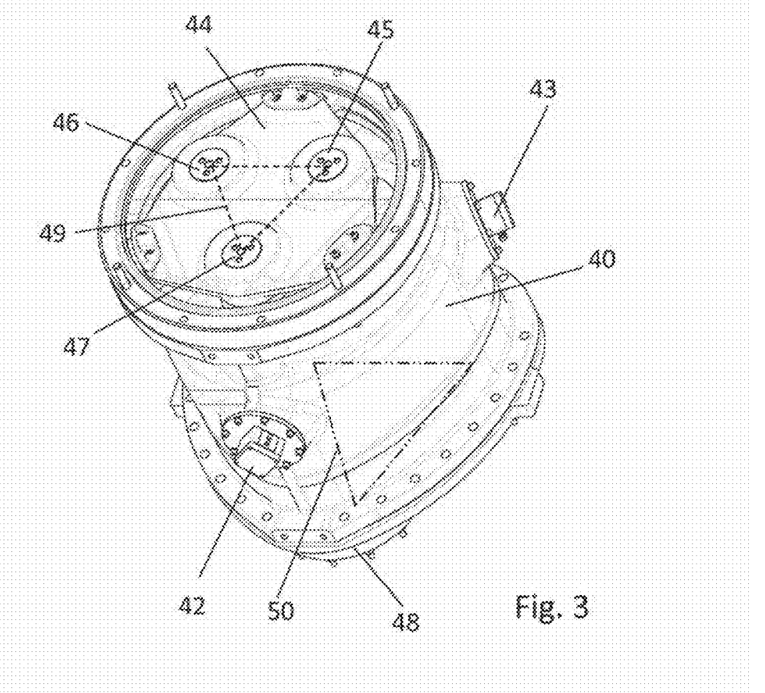
FIG. 3 shows a three-dimensional external view of a cable termination.

FIG. 3 shows a three-dimensional view of a cable termination comprising a housing 40 and a base closure element 48. The housing is open at the top end side which is situated opposite the base closure element 48, as a result of which it is possible to look into the interior of the cable termination from above. As a result, the solid insulation 44, for example a cast resin, into which the electrical connections of the three phases 45, 46, 47 for connection to the switchgear assembly are incorporated, is visible. These connections are called cable connection elements in the text which follows.

Said figure also shows that the housing 40 is equipped with three high-voltage identification units which are associated with the phases, wherein, in FIG. 3 with the high-voltage identification units 42, 43, only two of said high-voltage identification units are actually visible. Accordingly, the housing 40 has three pre-fabricated openings for fitting these high-voltage identification units.

Figure 2:
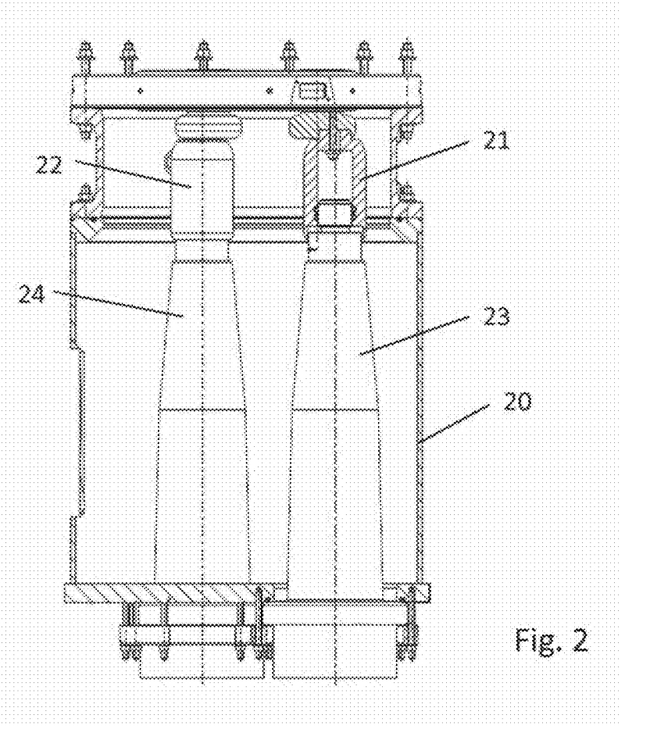
FIG. 2 shows a lateral side view of a known cable termination.

In addition to the elements already mentioned, the lateral side view, illustrated in FIG. 2, of a known cable termination shows the cable connection elements 21, 22 which are located in the interior of the housing 20 and are each fixedly connected to one of the phase connection parts 23, 24. For reasons of illustration, only in each case two of the cable connection elements and phase connection parts are shown once again, whereas the respectively third cable connection elements and phase connection parts are not visible due to the sectional illustration.

During installation of the high-voltage switchgear assembly, cable end reinforcements, not illustrated in FIG. 2, are inserted into a respectively associated phase connection part, as a result of which a high-voltage cable which adjoins the cable end reinforcements is electrically conductively connected to the cable connection element which is associated with the respective phase connection part. This process of bringing the high-voltage switchgear assembly into connection with the high-voltage cables can take place either while still on the switchgear assembly manufacturer premises or not until the switchgear assembly is at the installation site.

As shown in FIGS. 2 and 3, the cable connection elements and respectively associated phase connection parts are arranged in a straight line in relation to one another in the known cable termination, that is to say the first triangle 49 which is formed by the cable connection elements in their exit plane out of the solid insulation 44 is aligned with the second triangle 50 which is formed by the phase connection parts in their exit plane out of the base closure element 48, wherein the corner point of the first triangle 49, which corner point is formed by a cable connection element, and the corner point of the second triangle 50, which corner point is formed by the phase connection part which is connected to this cable connection element, form corners which are associated with one another. The term "aligned" is intended to be understood to mean that the corners which are associated with one another each assume the smallest possible distance from one another, that is to say lie one above the other in the case of triangles of equal size, in a plan view of the cable termination of FIG. 3.

Figure 4:
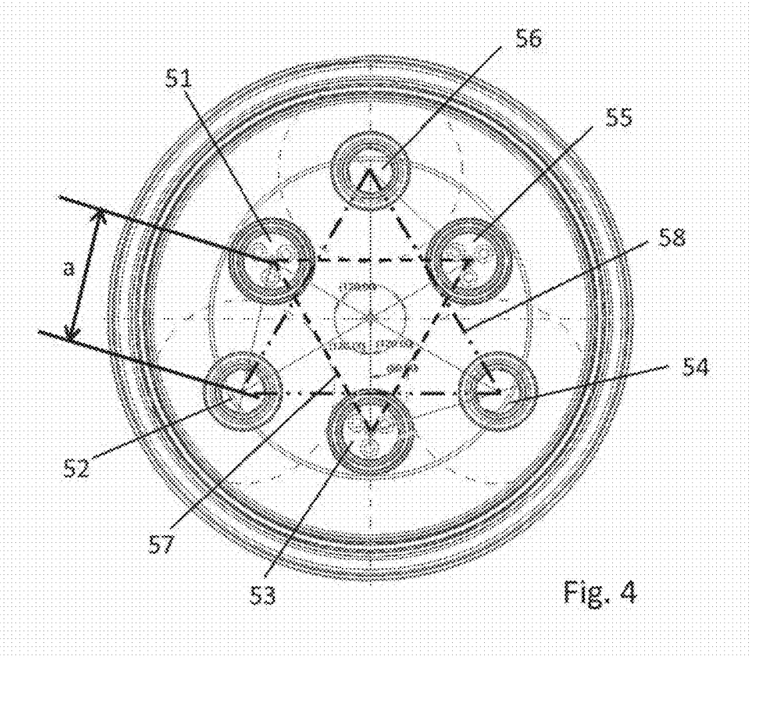
FIG. 4 is an illustration of the triangles which, according to the invention, are formed by cable connection elements and phase connection parts.

FIG. 4 is an illustration of the first triangle (57) and the second triangle (58) which are formed by cable connection elements 51, 53, 55 and phase connection parts 52, 54, 56 and, in this example, are rotated through 60° in relation to one another. Corners which are associated with one another are formed by the following pairs of cable connection elements and phase connection parts: [51, 52], [53, 54] and [55, 56].

Figure 5:
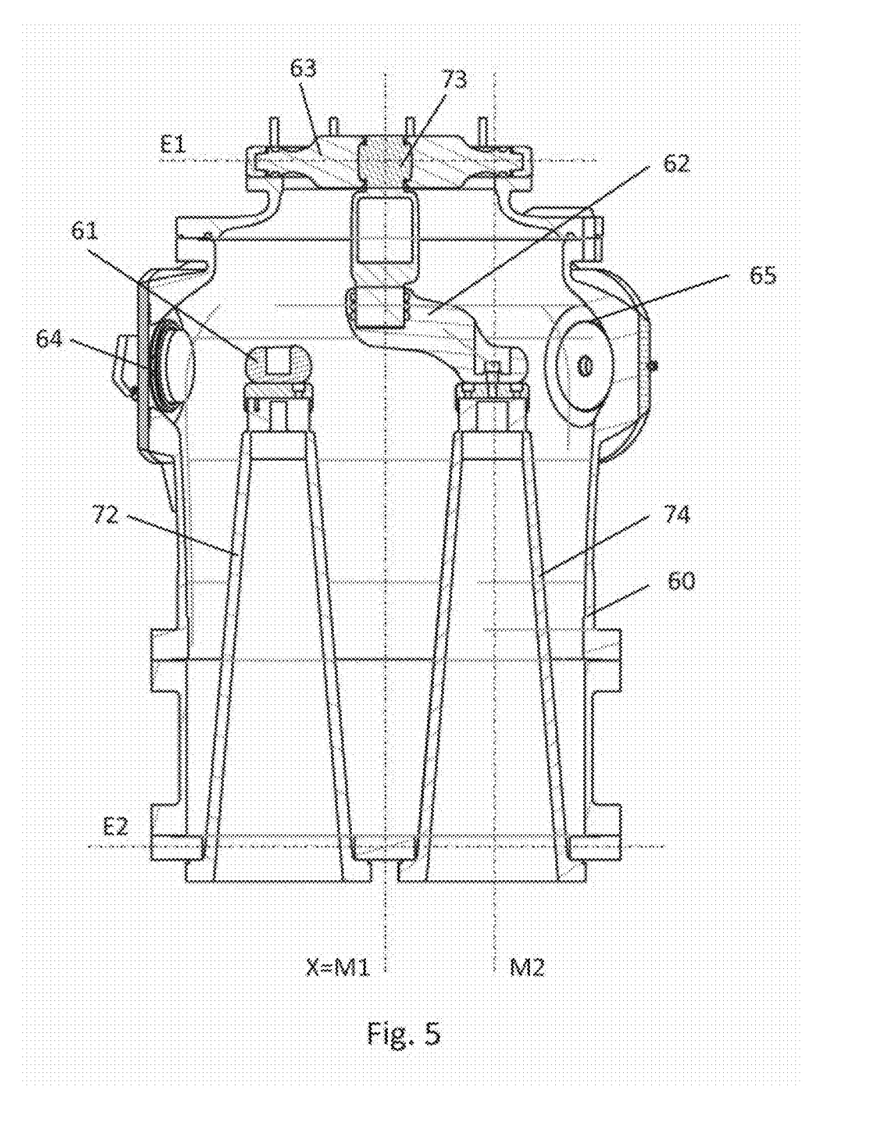
FIG. 5 is a lateral side view of a cable termination which is designed according to the invention.
Figure 6:
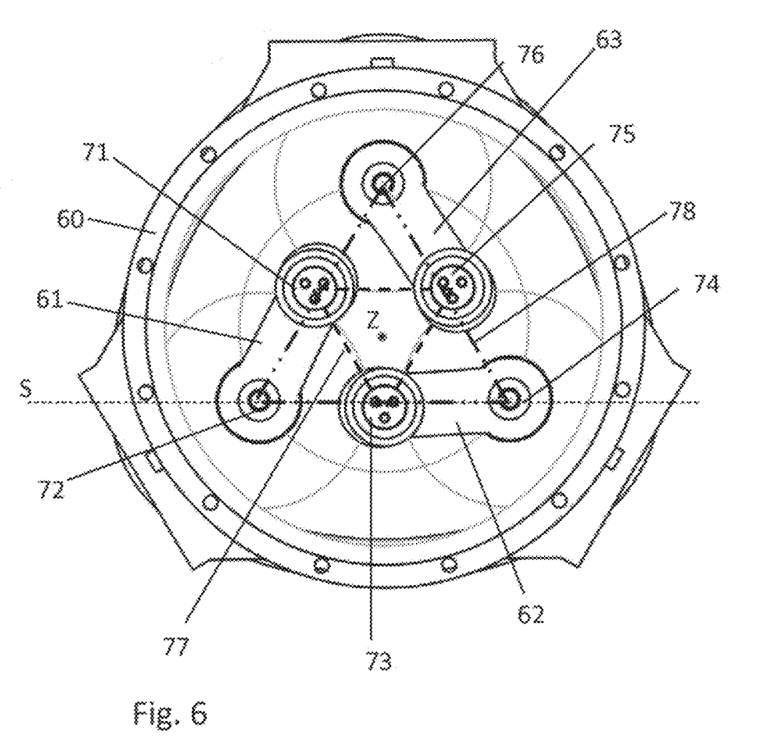
FIG. 6 shows a sectional view of the cable termination from FIG. 5 from above.

FIG. 5 shows a lateral side view of a cable termination which is designed according to the invention, and FIG. 6 shows a sectional view of this cable termination from above. Identical elements are provided with the same reference symbols in the text which follows.

FIGS. 5 and 6 once again show a housing 60 with a longitudinal extent, which housing is closed by a solid insulation 63 in the direction of the top end side, wherein three cable connection elements 71, 73, 75 protrude through the solid insulation 63 into the housing. The cable connection elements 71, 73, 75 have internal conductors for establishing an electrical connection to in each case one cable end reinforcement, not illustrated here, which is fitted to the end of a phase of a high-voltage cable. In addition, three phase connection parts 72, 74, 76, which are designed as hollow bodies and into each of which one of the cable end reinforcements would be inserted, protrude into the housing 60 from a side which is situated opposite the cable connection elements.

FIG. 6 indicates the sectional plane S along which the sectional view from FIG. 5 runs. Since the connecting element 61 is directed out of the sectional plane S, to the rear into the space, only an initial section, which is connected to the associated phase connection part 72, of said connecting element is actually visible. The elements 71, 75, 76 and 63 are not touched by the sectional plane S and therefore cannot be seen at all in FIG. 5.

The insulated cable connection elements 71, 73, 75 are arranged in a first plane E1, which runs perpendicular to the entry direction (M1) of the cable connection elements into the housing 60, such that they form the corners of the first triangle 77. The phase connection parts 72, 74, 76 are arranged in a second plane E2, which is parallel to the first plane E1, such that they form the corners of a second triangle 78. In this case, the respective corner of the first triangle 77, which corner corresponds to a cable connection element, and the respective corner of the second triangle, whichcorner corresponds to a phase connection part which is to be connected to the cable connection element, form two corners: [71, 72], [73, 74] which are associated with one another. The first triangle 77 and the second triangle 78 are rotated in relation to one another within their respective plane E1, E2, wherein the rotation takes place starting from a position, illustrated in FIG. 2, in which, in a plan view perpendicular to the first and second plane, the distances (a) between the respectively associated corners of the first and of the second triangle assume a value which is as small as possible.

As shown in FIG. 5 using the example of the cable connection element 73 and the associated phase connection part 74, the cable connection elements and phase connection parts, in their longitudinal extent, run parallel to the longitudinal axis X of the housing 60, as is also already the case in the known cable termination of FIG. 2. However, the cable connection elements and phase connection parts [71, 72], [73, 74] and [75, 76] which are associated with one another are arranged offset in relation to one another on account of the relative rotation of the first triangle (77) and second triangle (78) which are formed by them and also on account of the different sizes of said triangles. In order to bridge the resulting distance a between the center axis M1 of a cable connection element and the center axis M2 of the respectively associated phase connection part and to connect said cable connection element and phase connection part to one another both electrically and mechanically, an interposed connecting element is provided in each case, said connecting element assuming an angle of between 0 and 90° in relation to the center axes M1 and M2. This connection element is configured such that it can be partially or completely removed by a suitable mechanism, so that an insulating gap can be established between the cable connection element and the associated phase connection part if required.

In the embodiment shown here, the first triangle 77 and the second triangle 78 are equilateral triangles of which the center points are situated one above the other, and therefore the distance a is the same for all cable connection elements and phase connection parts which are associated with one another. Here, the relative rotation of the first triangle 77 in relation to the second triangle 78 is takes place about a rotation axis which runs through the center points Z of the triangles. In the case of non-equilateral triangles, for example isosceles triangles or else irregular triangles, the rotation could take place about a rotation axis which is formed by the connecting line between a so-called marked point of the first triangle and the corresponding marked point of the second triangle, wherein the marked points include the orthocenter, the circumcenter, the incenter and the centroid of the respective triangle.

In FIGS. 4 to 6, it is assumed that both the cable connection elements and the phase connection parts are arranged in triangular form. However, as an alternative, these components can also be arranged in a line, wherein the linear arrangement can be made only on the side of the cable connection elements or only on the side of the phase connection parts or else on both sides. In this case or else in the case of any desired further arrangements, it is likewise possible to establish a horizontal insulating gap by any desired rotation or spreading of the conductors.

Inserting the separate connecting elements between the cable connection element and the phase connection part therefore provides the advantage that it is possible to be able to electrically isolate the cable termination from the switchgear assembly by manual operation, without having to significantly increase the overall height of the high-voltage switchgear assembly for this purpose.

Therefore, proceeding specifically from the prior art of FIG. 1, an isolation point, which is to be manually operated, between the cable termination 2 and a combined line isolating and grounding switch 9 could be inserted in the form of an insulating gap which runs in the vertical direction, that is to say in extension of the high-voltage cable 11, 12, and would be able to be bridged by manual operation. However, this would lead to an increase in the overall height of the switchgear assembly 1. By inserting connecting elements 61, 62, 63 which run almost in the transverse direction to the longitudinal extent X of the cable termination, it is now possible to insert an isolation point, which is to be mechanically operated and runs in the horizontal direction and therefore leaves the overall height uninfluenced, by providing a manually releasable connection, in particular a screw or plug connection, between the connecting element and the associated cable connection element and/or the associated phase connection part.

In this case, manual access to the releasable connections between connecting elements 61, 62, 63 and the associated cable connection elements 71, 73, 75 and/or phase connection parts 72, 74, 76 can take place by means of the housing openings 64, 65 which are provided in the housing 60 in any case and serve to fit, for example, high-voltage identification units, or by means of additional mounting openings in the housing. If there is a releasable connection only to one of the two elements, cable connection element or phase connection part, there should be at least one rotatably mounted connection to the other element so that, after the releasable connection is opened, the connecting element can be rotated in the horizontal plane, that is to say about a rotation axis which runs parallel to the center axis of the cable connection element (M1) or the phase connection part (M2), in order to create an adequate insulating gap in this way. If, in contrast, the connecting elements are releasably fastened to both ends, said connecting element can be entirely removed from the interior of the housing 60 through the housing openings 64, 65. Under certain circumstances, the connecting elements can also be of multipartite design in order to be able to remove them from the housing 60 in several individual pieces.

The invention claimed is:

1. A cable termination for connecting a switchgear assembly to a high-voltage cable, comprising
   at least one housing,
   three insulated cable connection elements which protrude into the housing and have an internal conductor for establishing an electrical connection of the switchgear assembly to in each case one cable end reinforcement which is fitted to the end of a phase of a high-voltage cable,
   three phase connection parts which likewise protrude into the housing from a side which is situated opposite the cable connection elements, which are designed as hollow bodies and into which in each case one of the cable end reinforcements is to be inserted, wherein
   the insulated cable connection elements are arranged in a first plane, which runs perpendicular to the entry direction of the cable connection elements into the housing, such that they form the corners of a first triangle,
   the phase connection parts are arranged in a second plane, which is parallel to the first plane, such that they form the corners of a second triangle,
   the respective corner of the first triangle, which corner corresponds to a cable connection element, and the respective corner of the second triangle, which corner corresponds to a phase connection part which is to be connected to the cable connection element, form two corners which are associated with one another,
   the first triangle and the second triangle are rotated in relation to one another within their respective plane, wherein the rotation takes place starting from a position in which, in a plan view perpendicular to the first and second plane, the distances between the respectively associated corners of the first and of the second triangle assume a value which is as small as possible, and
   a connecting element is arranged between in each case one cable connection element and the associated phase connection part.

2. The cable termination according to claim 1, wherein the connecting elements are of rotatable design at a contact point with their associated cable connection element and/or the associated phase connection part.

3. The cable termination according to claim 1, wherein the connecting elements are of multipartite design.

4. The cable termination according to claim 1, wherein the first triangle of a first embodiment of the housing with a first longitudinal extent is selected to be the same size as the first triangle of a second embodiment of the housing with a second longitudinal extent which differs from the first longitudinal extent, and in that the first triangle and the associated second triangle are rotated in relation to one another in both embodiments until the distances between the associated corners of the triangles of the first embodiment are approximately the same size as the distances between the associated corners of the triangles of the second embodiment.

5. The cable termination according to claim 1, wherein the connecting line between a first marked point of the first triangle and a second marked point of the second triangle runs perpendicular to the first and, respectively, second plane and the rotation takes place about the axis which is formed by the connecting line, wherein the marked points are at least one of the orthocenter, the circumcenter, the incenter or the centroid of the respective triangle.

6. The cable termination according to claim 1, wherein at least the first triangle or the second triangle is an isosceles triangle or equilateral triangle.

7. The cable termination according to claim 6, wherein the first triangle and the second triangle are each an equilateral triangle, the rotation of said triangles takes place about the connecting line of the center point of the two triangles.

8. The cable termination of claim 6, wherein at least the first triangle or the second triangle is an isosceles triangle.

9. The cable termination according to claim 1, wherein the internal conductors of the cable connection elements and the phases of the high-voltage cable within the housing are oriented parallel to one another in a first direction, and the connecting elements each bridge an offset, which is produced on account of the rotation, between the cable connection element and the associated phase connection part.

10. The cable termination according to claim 9, wherein the connecting elements are each connected to their associated cable connection element and/or to the associated phase connection part in a releasable manner.

11. The cable termination according to claim 9, wherein the connecting elements are of rotatable design at a contact point with their associated cable connection element and/or the associated phase connection part.

12. The cable termination according to claim 9, wherein the connecting elements are of multipartite design.

13. The cable termination according to claim 9, wherein the first triangle of a first embodiment of the housing with a first longitudinal extent is selected to be the same size as the first triangle of a second embodiment of the housing with a second longitudinal extent which differs from the first longitudinal extent, and in that the first triangle and the associated second triangle are rotated in relation to one another in both embodiments until the distances between the associated corners of the triangles of the first embodiment are approximately the same size as the distances between the associated corners of the triangles of the second embodiment.

14. The cable termination according to claim 1, wherein the connecting elements are each connected to their associated cable connection element and/or to the associated phase connection part in a releasable manner.

15. The cable termination according to claim 14, wherein the connecting elements are of rotatable design at a contact point with their associated cable connection element and/or the associated phase connection part.

16. The cable termination according to claim 14, wherein the connecting elements are of multipartite design.

17. The cable termination of claim 14, wherein the releasable manner is a screwable or pluggable manner.

18. A combination comprising:
a switchgear assembly;
a high-voltage cable:
a cable termination connecting, comprising
at least one housing,
three insulated cable connection elements which protrude into the housing and have an internal conductor for establishing an electrical connection of the switchgear assembly to in each case one cable end reinforcement which is fitted to the end of a phase of a high-voltage cable,
three phase connection parts which likewise protrude into the housing from a side which is situated opposite the cable connection elements, which are designed as hollow bodies and into which in each case one of the cable end reinforcements is to be inserted, wherein
the insulated cable connection elements are arranged in a first plane, which runs perpendicular to the entry direction of the cable connection elements into the housing, such that they form the corners of a first triangle,
the phase connection parts are arranged in a second plane, which is parallel to the first plane, such that they form the corners of a second triangle,
the respective corner of the first triangle, which corner corresponds to a cable connection element, and the respective corner of the second triangle, which corner corresponds to a phase connection part which is to be connected to the cable connection element, form two corners which are associated with one another,
the first triangle and the second triangle are rotated in relation to one another within their respective plane, wherein the rotation takes place starting from a position in which, in a plan view perpendicular to the first and second plane, the distances between the respectively associated corners of the first and of the second triangle assume a value which is as small as possible, and
a connecting element is arranged between in each case one cable connection element and the associated phase connection part.

19. The combination according to claim 18, wherein the internal conductors of the cable connection elements and the phases of the high-voltage cable within the housing are oriented parallel to one another in a first direction, and the connecting elements each bridge an offset, which is produced on account of the rotation, between the cable connection element and the associated phase connection part.

20. The combination according to claim 18, wherein at least the first triangle or the second triangle is an isosceles triangle or equilateral triangle.

* * * * *